(12) United States Patent
Guo

(10) Patent No.: US 10,187,842 B2
(45) Date of Patent: Jan. 22, 2019

(54) DEVICE, METHOD AND USER EQUIPMENT IN A WIRELESS COMMUNICATION SYSTEM

(71) Applicant: SONY CORPORATION, Tokyo (JP)

(72) Inventor: Xin Guo, Beijing (CN)

(73) Assignee: SONY CORPORATION, Tokyo (JP)

( * ) Notice: Subject to any disclaimer, the term of this patent is extended or adjusted under 35 U.S.C. 154(b) by 298 days.

(21) Appl. No.: 14/890,310

(22) PCT Filed: Jun. 6, 2014

(86) PCT No.: PCT/CN2014/079311
§ 371 (c)(1),
(2) Date: Nov. 10, 2015

(87) PCT Pub. No.: WO2014/198197
PCT Pub. Date: Dec. 18, 2014

(65) Prior Publication Data
US 2016/0119854 A1 Apr. 28, 2016

(30) Foreign Application Priority Data
Jun. 9, 2013 (CN) .......................... 2013 1 0231334

(51) Int. Cl.
H04W 40/22 (2009.01)
H04L 29/08 (2006.01)
(Continued)

(52) U.S. Cl.
CPC ......... H04W 40/22 (2013.01); H04L 67/1051 (2013.01); H04W 4/023 (2013.01);
(Continued)

(58) Field of Classification Search
CPC ......... H04N 19/11; H04N 19/13; H04N 19/61
See application file for complete search history.

(56) References Cited

U.S. PATENT DOCUMENTS

2006/0115015 A1* 6/2006 Oh ........................ H04L 1/0656
375/267
2013/0107696 A1* 5/2013 Choi ..................... H04W 40/20
370/216

FOREIGN PATENT DOCUMENTS

CN 102387578 A 3/2012
CN 102625325 A 8/2012

OTHER PUBLICATIONS

International Search Report dated Sep. 26, 2014 for PCT/CN2014/079311.

* cited by examiner

Primary Examiner — Siming Liu
(74) Attorney, Agent, or Firm — Xsensus LLP

(57) ABSTRACT

A device, a method and a user equipment (UE) for a wireless communication system, the device including: a UE parameters acquisition unit configured to obtain UE parameters from a UE; a master UE determination unit configured to determine a master UE on the basis of the proximity of the UE to a data stream center, as shown by the UE parameters, the master UE being connected to an associated infrastructure and being provided with functionalities to forward data and/or signaling to other UEs; a communication unit configured to transmit to UEs network control signaling including information relating to the master UE. The device makes possible dynamic network planning while taking account of both network capacity and user equity, thereby improving resource utilization rates.

17 Claims, 14 Drawing Sheets

(51) Int. Cl.
   *H04W 4/02*    (2018.01)
   *H04W 40/12*   (2009.01)
   *H04W 40/32*   (2009.01)
   *H04W 76/14*   (2018.01)
   *H04W 88/04*   (2009.01)
   *H04W 84/20*   (2009.01)
(52) U.S. Cl.
   CPC ........... *H04W 40/12* (2013.01); *H04W 40/32* (2013.01); *H04W 76/14* (2018.02); *H04L 67/18* (2013.01); *H04W 84/20* (2013.01); *H04W 88/04* (2013.01)

| signaling type | user equipment ID | networking mode | selecting mode |
|---|---|---|---| networking request signaling

FIG. 3A

| signaling type | user equipment ID | user equipment interconnection ID |
|---|---|---| user equipment interconnection request ID

FIG. 3B

DEVICE, METHOD AND USER EQUIPMENT IN A WIRELESS COMMUNICATION SYSTEM

FIELD OF THE INVENTION

The present disclosure relates to the field of wireless communication, and more particularly, to a device, method and user equipment in a wireless communication system for dynamic network planning.

BACKGROUND OF THE INVENTION

With the rapid development of semiconductor technology, micro-electronic technology and computer technology, mobile communication has been greatly developed and applied, and global information network is quickly evolving towards Internet Protocol (IP) based Network Generation Network (NGN). An important feature of the Next Generation Network is a heterogeneous radio access network formed by coexistence of a plurality of wireless communication technologies. The heterogeneous radio access network has abundant connotations in terms of radio technologies, coverage, network architectures, network performance and the like. From the view of the coverage, the wireless network can be classified as Wide Area Network (WAN), Metropolitan Area Network (MAN), Local Area Network (LAN), Personal Area Network (PAN) and the like. From the view of the network architectures, the wireless network can be classified as Single-hop Network of Point-to-Multipoint (PMP), Multi-hop Network, Mesh Network, Ad hoc and the like. These wireless networks form stereoscopic coverage in geographic distribution so as to provide users with wireless multimedia services with abundant contents together everywhere. However, the heterogeneous network increases network coverage density and complexity of the network layout, thereby aggravating confliction between user's bandwidth requirements and rareness of the radio resources.

In view of the above circumstances, the modern mobile communication network further introduces the concept of a small base station (SBS) on the basis of a macro base station (MBS) serving as an infrastructure to provide communication access for user equipment (UE). The small base station provides signal coverage for a small cell, and can be further classified as a pico base station (PBS) covering a pico cell and a femto base station (FBS) covering a femto cell. The small base station intends to provide signal access with high quality for users within a local area and equalize load of the macro base station, thereby improving overall capacity of the network. However, as the infrastructure, the small base station has properties of lacking flexibility, and is limited by a fixed position, a limited coverage density and signal range, and when a large number of users gather out of the signal coverage of the small base station, the small base station loses utility.

Further, with continuous extension of the coverage of the user equipment, including smart phone, tablet computer, notebook computer and the like, intelligentization and data processing capabilities thereof are increasingly grow, and thus making it possible that the user equipment serves as supplementation for the infrastructure. However, the improvement of the processing capability expedites diversity of user's requirements at the same time, and thus resulting in increasingly aggravation of complexity in networking mode of the communication network.

The user equipment serving as supplementation for the infrastructure increases flexibility in networking, while aggravating complexity in management. The existing technology has proposed some selections and management for part of circumstances in the above networking modes, which either makes networking selections according to user's request or makes networking selections according to link quality. However, the problem in the existing technology lies in first, there has never been a technology which can be applied to planning of various networking nodes described above at the same time; and second, there has never been a technology which takes a problem of fairness caused by difference in roles of the user equipment into consideration.

SUMMARY OF THE INVENTION

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

Thus, in view of the above circumstances, an object of the disclosure is to provide an adaptive dynamic network planning method being commonly applied to the modern mobile communication network, which when specifying a networking decision scheme starts at increasing network capacity, and considers networking willingness, data processing capability and distribution feature of the user equipment in combination, while also taking the differences in roles of the user equipment in different networking modes (especially for a scene of data forwarding) into consideration so as to ensure fairness among users, thereby greatly promoting the willingness of the user equipment to bear data forwarding, improving practicability of the concept that the user equipment serves as supplementation for the infrastructure, and ensuring possibility of increasing network capacity by utilizing the method.

According to an aspect of the disclosure, there is provided a device in a wireless communication system, the device including: a user equipment parameter acquiring unit configured to acquire a user equipment parameter from user equipment; a master user equipment determining unit configured to determine master user equipment according to closeness of the user equipment to a center of communication data stream which is determined based on the user equipment parameter, wherein the master user equipment is connected to an associated infrastructure and forwards data and/or signaling for other user equipment; and a communicating unit configured to send to the user equipment a networking control signaling including information about the master user equipment.

According to a preferred embodiment of the disclosure, the master user equipment determining unit may further include: a distribution feature parameter acquiring module configured to acquire a distribution feature parameter indicating the closeness of the user equipment to the center of communication data stream according to the user equipment parameter; and a master user equipment selecting module configured to select the master user equipment according to the distribution feature parameter.

According to another preferred embodiment of the disclosure, the master user equipment determining unit may further include: a forwarding feature parameter calculating module configured to calculate a forwarding feature parameter of the user equipment according to at least one of an amount of data and signaling forwarding of the user equipment, a forwarding probability indicating that the user equipment succeeds in forwarding and a forwarding level indicating forwarding capability of the user equipment which are included in the user equipment parameter. Preferably, the master user equipment selecting module may be further configured to select the master user equipment according to the forwarding feature parameter.

According to another preferred embodiment of the disclosure, the distribution feature parameter acquiring module may further include: a user equipment grouping component configured to group the user equipment according to a networking mode parameter in the user equipment parameter; a candidate master user equipment determining component configured to determine a set of candidate master user equipment in each group of user equipment according to a link quality between each user equipment in this group and its associated infrastructure; and a distribution feature parameter calculating component configured to calculate the distribution feature parameter of each of the set of candidate master user equipment in each group according to position information between each candidate master user equipment in this group and other user equipment as well as an infrastructure associated therewith.

According to another preferred embodiment of the disclosure, the user equipment grouping component may be further configured to divide the user equipment for which the networking mode parameter indicates establishment of device to device interconnection and/or point to multi-point interconnection and which have the same interconnection identifier as a first type group, divide the user equipment for which the networking mode parameter indicates being accessible via other user equipment as a second type group, and divide the user equipment for which the networking mode parameter indicates accessing only via an infrastructure as a third type group.

According to another preferred embodiment of the disclosure, for the second type group, the user equipment grouping component may be further configured to divide coverage of the infrastructure into a plurality of sectors according to regional distribution so that user equipment in each sector are divided as one group, and the candidate master user equipment determining component may be further configured to determine the set of candidate master user equipment in a unit of sector.

According to another preferred embodiment of the disclosure, for the first type group, the distribution feature parameter calculating component may be configured to calculate the distribution feature parameter of each candidate master user equipment in this group according to distances between this candidate master user equipment and all other user equipment in this group as well as an infrastructure associated with this candidate master user equipment, and for the second type group, the distribution feature parameter calculating component may be configured to calculate the distribution feature parameter of each candidate master user equipment in this group according to distances between this candidate master user equipment and user equipment other than the set of candidate master user equipment in this group as well as an infrastructure associated with this candidate master user equipment.

According to another preferred embodiment of the disclosure, the distribution feature parameter calculating component may be further configured to calculate the distribution feature parameter of each of the set of candidate master user equipment in each group according to transmission load on a communication link associated with this candidate master user equipment.

According to another preferred embodiment of the disclosure, the forwarding feature parameter calculating module may be further configured to calculate the forwarding feature parameter of the user equipment in each group based on the grouped user equipment.

According to another preferred embodiment of the disclosure, the device in the wireless communication system may further include a slave user equipment determining unit configured to select slave user equipment associated with the master user equipment according to at least the forwarding feature parameter, wherein the slave user equipment communicates with other user equipment and the infrastructure via the associated master user equipment, and wherein the communication unit may be further configured to send the networking control signaling including information about the slave user equipment to the user equipment.

According to another aspect of the disclosure, there is also provided a method for use in a wireless communication system, the method may include: a user equipment parameter acquiring step of acquiring a user equipment parameter from user equipment; a master user equipment determining step of determining master user equipment according to closeness of the user equipment to a center of communication data stream which is determined based on the user equipment parameter, wherein the master user equipment is connected to an associated infrastructure and forwards data and/or signaling for other user equipment; and a communicating step of sending to the user equipment a networking control signaling including information about the master user equipment.

According to another aspect of the disclosure, there is also provided user equipment in a wireless communication system, the user equipment may include: a communicating unit configured to send a user equipment parameter to the device in the wireless communication according to the embodiments of the disclosure and receive a networking control signaling from the device; and a controlling unit configured to control, if the networking control signaling received from the device indicates that the user equipment is master user equipment, the communicating unit to forward data and/or signaling between slave user equipment associated with the master user equipment and between the slave user equipment and an infrastructure.

According to a preferred embodiment of the disclosure, the user equipment may further include: a positioning unit configured to acquire position information of the user equipment. Preferably, the communicating unit may be further configured to send the position information of the user equipment to the device upon receipt of a position information request sent from the device.

According to another preferred embodiment of the disclosure, if the networking control signaling received from the device indicates that the user equipment is slave user equipment, the controlling unit controls the communicating unit to communicate with other user equipment and/or an associated infrastructure via master user equipment associated with the slave user equipment.

According to yet another aspect of the disclosure, there is also provided a storage medium including machine-readable program codes which when executed on an information processing apparatus cause the information processing apparatus to perform the following steps: a user equipment parameter acquiring step of acquiring a user equipment parameter from user equipment; a master user equipment determining step of determining master user equipment according to closeness of the user equipment to a center of communication data stream which is determined based on the user equipment parameter, wherein the master user equipment is connected to an associated infrastructure and forwards data and/or signaling for other user equipment; and a communicating step of sending to the user equipment a networking control signaling including information about the master user equipment.

According to still another aspect of the disclosure, there is also provided a program product including machine-executable instructions which when executed on an information processing apparatus cause the information processing apparatus to perform the following steps: a user equipment parameter acquiring step of acquiring a user equipment parameter from user equipment; a master user equipment determining step of determining master user equipment according to closeness of the user equipment to a center of communication data stream which is determined based on the user equipment parameter, wherein the master user equipment is connected to an associated infrastructure and forwards data and/or signaling for other user equipment; and a communicating step of sending to the user equipment a networking control signaling including information about the master user equipment.

The present technology is a general-purpose method for managing the wireless network networking without being based on an air interface of the network, that is, regardless of whether the wireless network is a long term evolution (LTE) network or an Ad hoc network or the like, for example, a plurality of networking modes coexist at the same time as shown in FIG. 1.

Other aspects of the embodiments of the invention will be presented in the following detailed description serving to fully disclose preferred embodiments of the disclosure but not to limit the invention.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings:

FIG. 3A is a schematic diagram illustrating an example of a format of a networking request signaling included in a user equipment parameter according to an embodiment of the disclosure;

FIG. 3B is a schematic diagram illustrating an example of a format of a user equipment interconnection request signaling when the networking mode is "user equipment interconnection";

DETAILED DESCRIPTION OF THE INVENTION

Figure 1:
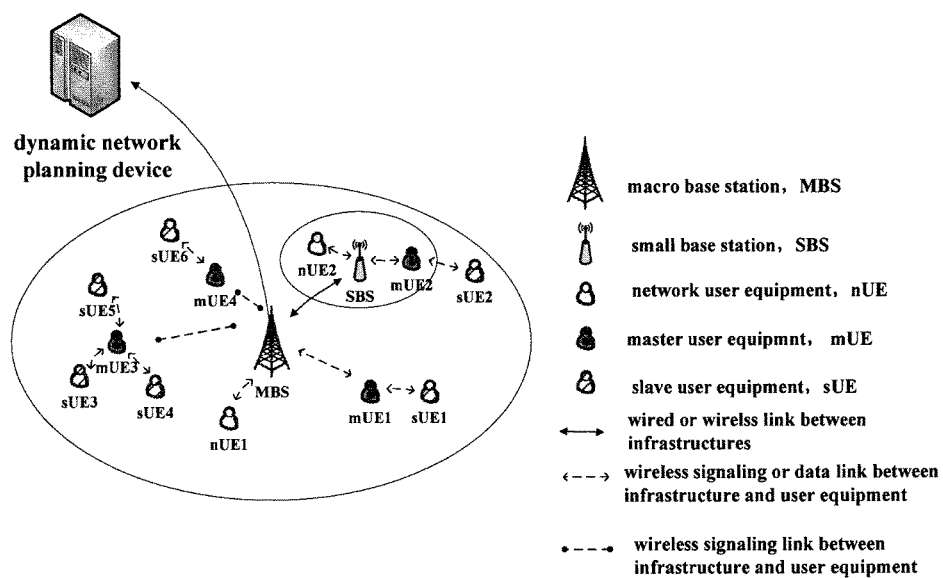
FIG. 1 is a schematic diagram illustrating a scene in which a plurality of networking modes coexist in a wireless communication system.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

First, an example of network architecture in a wireless communication system will be described with reference to FIG. 1, while a brief introduction of some concepts proposed in the invention will be given. FIG. 1 is a schematic diagram illustrating a scene in which a plurality of networking modes coexist in a wireless communication system.

As shown in FIG. 1, according to access modes and functions, the user equipment can be further classified as:
- a) Network user equipment (nUE): accessing the network via an infrastructure directly serving it and communicating via the infrastructure, for example, nUE1 and nUE2.
- b) Master user equipment (mUE): forwarding data and/or signaling for other network nodes. For example, mUE1 performs data forwarding between MBS and sUE1, which constitutes a relay network; mUE2 performs data forwarding between SBS and sUE2; mUE3 forms PMP interconnection with sUE3, sUE4 and sUE5, in which mUE3 takes charge of data forwarding among other user equipment, and mUE3 maintains a wireless signaling link with MBS so as to maintain the PMP interconnection; mUE4 forms device to device (D2D) interconnection with sUE6 and directly performs data exchange with sUE6, and mUE4 maintains wireless signaling link with MBS to maintain the D2D interconnection.
- c) Slave user equipment (sUE): communicating with other network nodes through data forwarding by the master user equipment, such as sUE1 to sUE5 described above, or forming D2D interconnections with other user equipment and the counterpart user equipment takes charge of maintenance of the wireless signaling link with the infrastructure so as to maintain the D2D interconnection, such as sUE6 described above.

It is to be understood that any user equipment may have multiple roles at the same time, for example, mUE1 serves as the network user equipment when directly making data connection with MBS to obtain communication service provided by the infrastructure, and serves as the master user equipment when taking charge of data forwarding between MBS and sUE1.

As can be seen from FIG. 1, in this wireless communication system, a plurality of networking modes including the relay network, the D2D interconnection and the PMP interconnection and the like coexist, and thus it needs to perform dynamic network planning according to variations in network operating conditions and in the requirements, processing capabilities and functions of the user equipment, so as to ensure a high network capacity and fairness among the user equipment.

Figure 2:
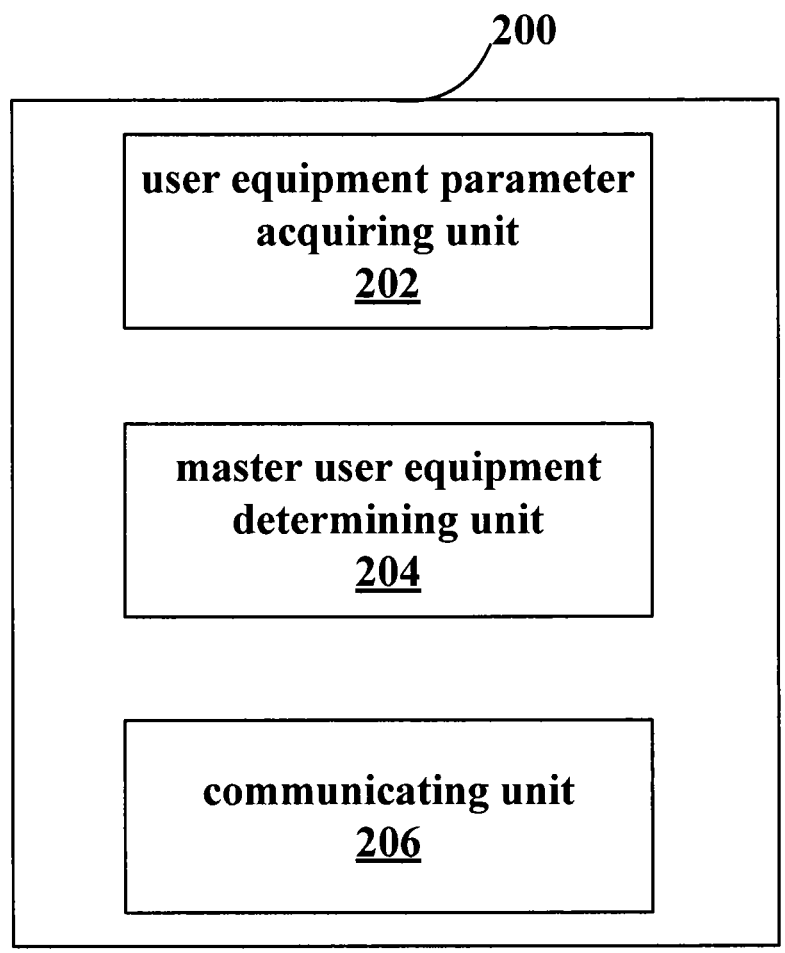
FIG. 2 is a block diagram illustrating an example of functional configuration f a device in a wireless communication system according to an embodiment of the disclosure.

Next, an example of functional configuration of a device in a wireless communication system according to an embodiment of the disclosure will be described with reference to FIG. 2. FIG. 2 is a block diagram illustrating an example of functional configuration of a device in a wireless communication system according to an embodiment of the disclosure.

As shown in FIG. 2, the device 200 in the wireless communication system may include a user equipment parameter acquiring unit 202, a master user equipment determining unit 204 and a communicating unit 206.

The user equipment parameter acquiring unit 202 may be configured to acquire a user equipment parameter from the user equipment.

It is to be noted that the user equipment parameter referred to herein indicates a parameter required when performing dynamic network planning. Therefore, in addition to traditional service requirement parameters, quality of service (QoS) parameters and link quality measurement and feedback relevant parameters which are required when establishing communication network link, the user equipment parameter may include but not limited to position information of the user equipment and a networking request signaling issued by the user equipment and so on.

The position information of the user equipment may be longitude and latitude values representing an absolute position of the user equipment, and may also be coordinate values representing a relative position of the user equipment within a predetermined coordinate system, and the disclosure makes no limitation on this. The position information may be obtained by performing Global Positioning System (GPS) measurement by means of a GPS sensor, and may also be obtained by network measurement (for example, triangular measurement). The device 200 may initiates a position information request to the user equipment or initiates the network measurement when the position information is needed so as to obtain the feedback result.

The networking request signaling provides a mechanism for selecting and switching among different networking modes, the user equipment may select different networking modes by transmitting the networking request signaling to the device 200, thereby implementing dynamic adjustment of the network structure to improve utilization rate for the network resources. As an example, an example of a format of the networking request signaling will be described with reference to FIG. 3A below. FIG. 3A is a schematic diagram illustrating an example of a format of the networking request signaling included in the user equipment parameter according to the embodiment of the disclosure.

As shown in FIG. 3A, the networking request signaling includes four sub-fields, that is, a signaling type, a user equipment identifier (ID), a networking mode and a selecting mode. Meanings represented by each of the sub-fields will be described in detail respectively below.

Specifically, the signaling type identifies the signaling as the networking request signaling.

The user equipment ID identifies the user equipment initiating the signaling, the user equipment ID being a global unique identifier allocated to the user equipment.

The networking mode identifies a manner in which the user equipment access the network, and may include "accessing only via the infrastructure", "accessible via other user equipment" and "user equipment interconnection", and a default value is "accessing only via the infrastructure", which aims to be compatible with original wireless communication network system. When the networking mode is "accessing only via the infrastructure" or the default value, it means that user equipment only supports accessing the network via the infrastructure; when the networking mode is "accessible via other user equipment", it means that the user equipment supports a networking mode in which the master user equipment serves to forward data between the infrastructure and the slave user equipment and this user equipment may be the master user equipment or the slave user equipment; and when the networking mode is "user equipment interconnection", it means that the user equipment wishes to establish the D2D interconnection or the PMP interconnection with other user equipment, and this user equipment may be the master user equipment or the slave user equipment.

It is to be understood that for the user equipment for which the networking mode is "accessing only via the infrastructure", the networking procedure thereof is the same as that in the prior art, and no discussion will be made herein. Therefore, the following discussion mainly aims at the user equipment for which the networking mode is "accessible via other user equipment" and "user equipment interconnection".

The selecting mode may include "network allocation" and "obligatory designation by user", and a default value thereof is "network allocation". When the selecting mode is "network allocation" or the default value, it means the user equipment supports a networking decision result issued by the device 200 for example; and when the selecting mode is "obligatory designation by user", it means the user equipment designates association relationship between itself and relevant network nodes, that is, the user equipment designates whether it is the master user equipment or the slave user equipment. The following discussion mainly aims at the case in which the selecting mode is "network allocation".

Particularly, for the user equipment for which the networking mode is "user equipment interconnection", user equipment wishing to join the same interconnection need to transmit to the device 200 a user equipment interconnection request signaling. Similarly, for the user equipment for which the networking mode is "accessible via other user equipment", a group of user equipment wishing to access the infrastructure via certain user equipment as a relay node need to transmit to the device 200 the user equipment interconnection request signaling. FIG. 3B is a schematic diagram illustrating an example of a format of the user equipment interconnection request signaling.

As shown in FIG. 3B, the user equipment interconnection request signaling may include three sub-fields, that is, a signaling type, a user equipment ID and a user equipment interconnection ID. Specifically, the signaling type identifies this signaling as the user equipment interconnection request signaling, the user equipment ID is a global unique identifier allocated to the user equipment issuing the user equipment interconnection request signaling, and the user equipment interconnection ID is a global unique identifier allocated to interconnection which the user equipment wishes to join.

According to different networking modes in the networking request signaling issued by the user equipment, the user equipment parameter acquiring unit 202 may acquire the user equipment parameter in different ways.

Basically, for the user equipment for which the selecting mode is "network allocation", the user equipment parameter acquiring flow may be as follows: the user equipment transmits to for example the device 200 the networking request signaling at the time of initially accessing the network or needing to modify the networking mode, and the user equipment parameter acquiring unit 202 acquires from the user equipment the user equipment parameter including the networking request signaling.

While for the user equipment for which the networking mode is "user equipment interconnection" or "accessible via other user equipment" and having expectations for connected object, specifically, according to whether the selecting mode is "network allocation" or "obligatory designation by user", the user equipment parameter acquiring flow is as follows:

When the selecting mode is "network allocation", first, user equipment which only serves as temporary master user equipment (that is, for only use in initiating user equipment interconnection and different from the master user equipment being responsible for actual data forwarding after the interconnection is established) sends the networking request signaling to the device 200, and the device 200 allocates a global unique "user equipment interconnection ID" to this interconnection and sends it to the temporary master user equipment. This temporary master user equipment issues the received "user equipment interconnection ID" to other user equipment wishing to join this interconnection, for example, issues the received "user equipment interconnection ID" in an offline interpersonal interaction manner or in a broadcasting manner. Other user equipment wishing to join this interconnection send the user equipment interconnection request signaling including the "user equipment interconnection ID" to the device 200 after obtaining the "user equipment interconnection ID" (see FIG. 3B). Thus, the user equipment parameter acquiring unit 202 acquires from these user equipment the user equipment parameters including the user equipment interconnection request signaling, and the device 200 performs subsequent networking operation with these user equipment as one group of interconnection objects.

When the selecting mode is "obligatory designation by user", first, user equipment sends the networking request signaling to the device 200, the user equipment being designated as the master user equipment obligatorily, the device 200 allocates a global unique "user equipment interconnection ID" for this interconnection, other user equipment wishing to join this interconnection send the user equipment interconnection request signaling including the "user equipment interconnection ID" to the device 200 (see FIG. 3B), and thus the user equipment parameter acquiring unit 202 acquires from these user equipment the user equipment parameter including the user equipment interconnection request signaling, and the device 200 regards these equipment as the slave user equipment in this interconnection. For the user equipment for which the networking mode is "user equipment interconnection", these user equipment then proceed to establish network connection directly, while for the user equipment for which the networking mode is "accessible via other user equipment", the device 200 then selects an infrastructure providing best service for the master user equipment, and finally a relay network in which the master user equipment forwards data between the infrastructure and the slave user equipment is established.

Returning to refer to FIG. 2, the master user equipment determining unit 204 may be configured to determine the master user equipment according to closeness of the user equipment to a center of communication data stream which is determined based on the user equipment parameter, in which the master user equipment is connected to an associated infrastructure and forwards data and/or signaling for other user equipment.

It is to be understood that since the master user equipment mainly forwards data for the slave user equipment while having less signaling interaction with the infrastructure in the D2D interconnection and/or the PMP interconnection, the center of communication data stream indicates that the user equipment located at this position is able to provide an optimal fair channel quality for other networked user equipment, while for the relay network, since the link between the master user equipment and the infrastructure not only takes charge of transferring data of the master user equipment but also forwards data of the slave user equipment, the center of communication data stream indicates that the user equipment located at this position is able to provide optimal fair data forwarding between the infrastructure and other networked user equipment. It is to be understood that the center of communication data stream is different from an actual geographical position center and is related to channel quality, communication load on the link among the network nodes (including the infrastructure and the user equipment) and a geographical position of each user equipment and the like.

Therefore, the master user equipment determining unit 204 may preferably select the user equipment which is closest to the center of communication data stream described above as the master user equipment according to the acquired user equipment parameter.

Figure 4:
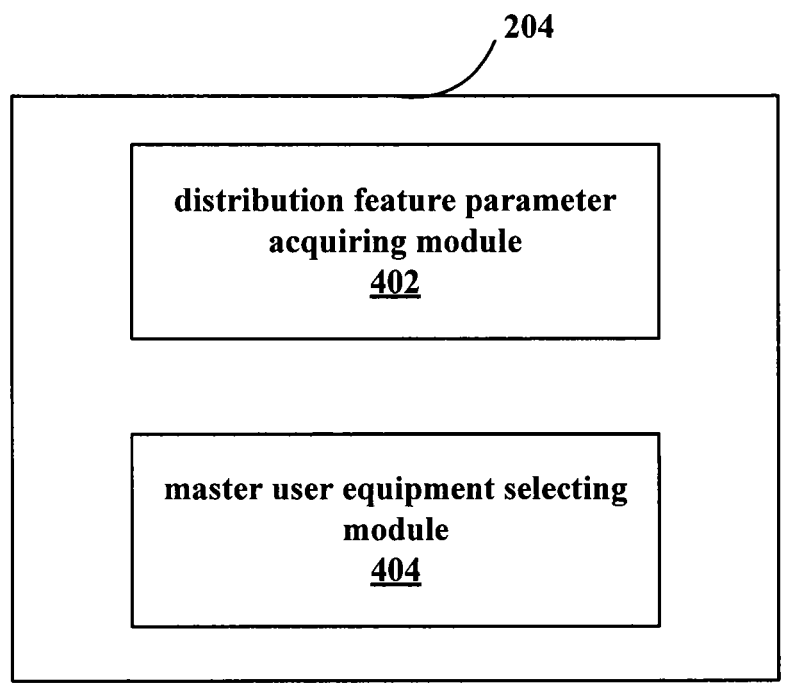
FIG. 4 is a block diagram illustrating an example of functional configuration of a master user equipment determining unit in the device as shown in FIG. 2.

An example of functional configuration of the master user equipment determining unit 204 will be described with reference to FIG. 4 in detail below. FIG. 4 is a block diagram illustrating an example of functional configuration of the master user equipment determining unit in the device as shown in FIG. 2.

As shown in FIG. 4, the master user equipment determining unit 204 may further include a distribution feature parameter acquiring module 402 and a master user equipment selecting module 404.

The distribution feature parameter acquiring module 402 may be configured to acquire a distribution feature parameter indicating the closeness of the user equipment to the center of communication data stream according to the acquired user equipment parameter.

The master user equipment selecting module 404 may be configured to select the master user equipment according to the acquired distribution feature parameter.

Figure 5:
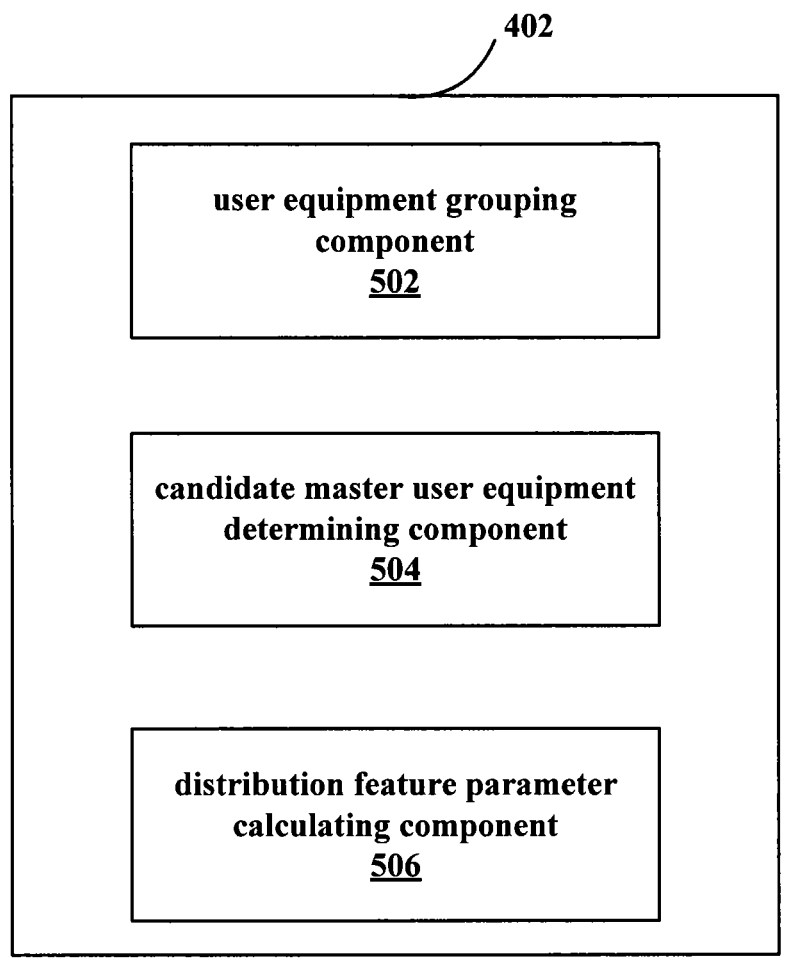
FIG. 5 is a block diagram illustrating an example of functional configuration of a distribution feature parameter acquiring module in the master user equipment determining unit as shown in FIG. 4.

An example of functional configuration of the distribution feature parameter acquiring module 402 will be described with reference to FIG. 5 in detail below. FIG. 5 is a block diagram illustrating an example of functional configuration of the distribution feature parameter acquiring module in the master user equipment determining unit as shown in FIG. 4.

As shown in FIG. 5, the distribution feature parameter acquiring module 402 may further include a user equipment grouping component 502, a candidate master user equipment determining component 504 and a distribution feature parameter calculating component 506.

The user equipment grouping component 502 may be configured to group the user equipment according to a networking mode parameter in the user equipment parameter.

Preferably, the user equipment grouping component 502 may be further configured to divide the user equipment for which the networking mode parameter indicates "user equipment interconnection" (that is, establishment of D2D interconnection and/or PMP interconnection) as a first type group, divide the user equipment for which the networking mode parameter indicates "accessible via other user equipment" as a second type group, and divide the user equipment for which the networking mode parameter indicates "accessing only via an infrastructure" as a third type group. Particularly, the first type group or the second type group may be further divided according to the user equipment interconnection ID, for example, user equipment having the same user equipment interconnection ID in the first type group or the second type group may be divided as one group.

Preferably, user equipment having no parameter of user equipment interconnection ID in the second type group may be further divided according to regional distribution, since such forwarding may possibly improve network throughput only when the link from the master user equipment serving to perform data forwarding to the infrastructure and to the slave user equipment is better than a direct link from the infrastructure to the slave user equipment, and the link quality is related to distance among the network nodes, and thus when the determined master user equipment is too far away from the slave user equipment, such forwarding makes no sense.

In view of this, preferably, the user equipment grouping component 502 may be further configured to divide coverage of the infrastructure into a plurality of sectors according to regional distribution so that user equipment in each sector are divided as one group. It is to be understood that the master user equipment only provides data forwarding for the slave user equipment within the same sector in order to ensure link quality. As an example, the user equipment grouping component 502 may utilize a common three-sector dividing method in prior art to equally divide the coverage of the infrastructure into three sectors.

Figure 6:
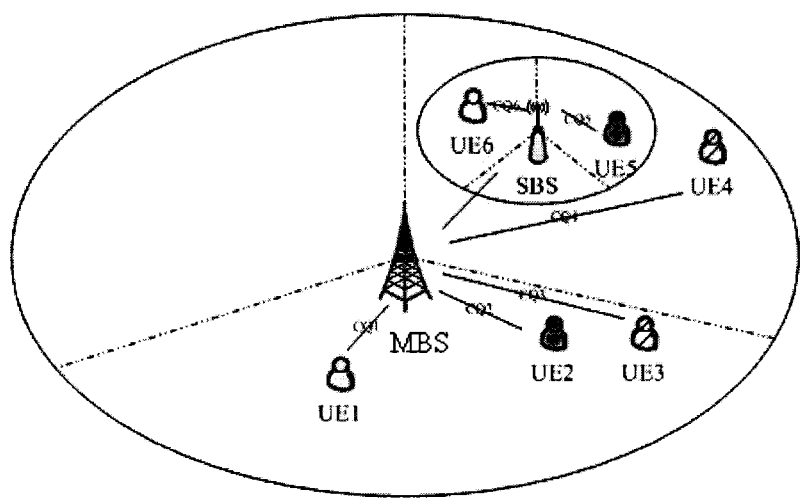
FIG. 6 is a schematic diagram illustrating an example of a grouping result of the user equipment according to an embodiment of the disclosure.

FIG. 6 is a schematic diagram illustrating an example of a user equipment grouping result according to an embodiment of the disclosure. As shown in FIG. 6, the macro cell covered by the macro base station MBS and the small cell covered by the small base station SBS are divided into three sectors respectively.

Further, it is to be understood that the above grouping operation is not to physically group the user equipment, and the first type group, the second type group and the third type group described above are only concepts obtained by performing virtual division.

The candidate master user equipment determining component 504 may be configured to determine a set of candidate master user equipment in each group of user equipment according to a link quality between each user equipment in this group and its associated infrastructure.

Specifically, in the first type group, for a group having the same "user equipment interconnection ID", a D2D or PMP network will be constructed with a certain node as the master user equipment, the master user equipment performing data exchange with other slave user equipment or taking charge of performing data forwarding for other slave user equipment, while keeping a good signaling link with the infrastructure so as to maintain the interconnection. In the second type group, a relay network between the infrastructure and the master/slave user equipment will be constructed, the link between the master user equipment and the infrastructure not only provides communication for the master user equipment itself, but also forwards data for the slave user equipment, and thus it needs to ensure a relatively high link quality. Therefore, a prior condition on which the user equipment becomes the master user equipment is to have a link of good quality to the infrastructure.

As an example, preferably, the candidate master user equipment determining component 504 may determine the set of candidate master user equipment in the first/second type group in the following way: an infrastructure having best channel quality is selected for each user equipment within a region in which the user equipment locates, and thus the user equipment having the same "user equipment interconnection ID" and the infrastructure associated with these user equipment are divided as one group, while the user equipment having no parameter of "user equipment interconnection ID", located within the same region and associated with the same infrastructure are divided as one group, and then the user equipment having a channel quality equal to or higher than a predetermined channel quality threshold with respect to the associated infrastructure within each group are added into the set of candidate master user equipment.

The distribution feature parameter calculating component 506 may be configured to calculate the distribution feature parameter of each of the set of candidate master user equipment in each group according to position information between each candidate master user equipment in this group and other user equipment as well as an infrastructure associated therewith.

Specifically, for the first type group, the distribution feature parameter calculating component 506 may be configured to calculate the distribution feature parameter of each candidate master user equipment in this group according to distances between this candidate master user equipment and all other user equipment in this group as well as an infrastructure associated with this candidate master user equipment.

While for the second type of group, the distribution feature parameter calculating component 506 may be configured to calculate the distribution feature parameter of each candidate master user equipment in this group according to distances between this candidate master user equipment and user equipment other than the set of candidate master user equipment in this group as well as an infrastructure associated with this candidate master user equipment.

As described above, since the master user equipment is generally user equipment closest to the center of communication data stream, the calculation of the distribution feature parameter of the user equipment should also take transmission load of the communication link associated with the user equipment into consideration. Preferably, the distribution feature parameter calculating component 506 may be further configured to calculate the distribution feature parameter of each of the set of candidate master user equipment in each group according to transmission load on a communication link associated with this candidate master user equipment.

A specific procedure of calculating the distribution feature parameter will be given below as an example.

As an example, an index measuring the distribution feature parameter of the user equipment is a weighted closeness centrality, which can be represented by the following equation:

$$WCC(UE_i) = (n-1)/\Sigma_{j \neq i} \beta_j \text{distance}(UE_i, UE_j)$$

Particularly, $WCC(UE_i)$ indicates the weighted closeness centrality of the candidate master user equipment $UE_i$; n indicates a total number of nodes involved in the calculation formula, including the involved user equipment, base station and the concerned candidate master user equipment itself; $\text{distance}(UE_i, UE_j)$ indicates a distance between the candidate master user equipment $UE_i$ and the network node $UE_j$, which can be obtained according to the position information of each network node; and $\beta_j$ is a weight assigned to the network node $UE_j$, which can be determined according to the communication payload of the link between the candidate master user equipment $UE_i$ and the network node $UE_j$.

It is to be understood that the smaller the value of the weighted closeness centrality is, it indicates that the user equipment is closer to the center of the communication data stream, that is, the user equipment is more suitable for being selected as the master user equipment.

As can be seen from the above description, in the first type group, since the basis for selecting the master user equipment is to ensure each slave user equipment obtains optimal fair channel quality as much as possible, when calculating the weighted closeness centrality, it needs to consider the distance and communication payload between each candidate master user equipment $UE_i$ and all other user equipment (including other candidate master user equipment and user equipment other than the set of candidate master user equipment) in the group and associated infrastructure. It is to be understood that when there exist a plurality of infrastructures, only the infrastructure associated with the currently concerned candidate master user equipment is considered. Further, in the first type group, since the master user equipment mainly forwards data for the slave user equipment and has less signaling interaction with the infrastructure, in order to simplify the calculation, the setting of the weight $\beta_j$ can be assumed as for example: if the network node $UE_j$ is the infrastructure, the weight $\beta_j$ is set as 1/n, otherwise, the weight $\beta_j$ is set as 1.

On the other hand, in the second type group, since the basis for selecting the master user equipment is to provide optimal fair data forwarding between the infrastructure and the salve user equipment as much as possible, when calculating the weighted closeness centrality, it needs to consider the distance and communication payload between each candidate master user equipment $UE_i$ and user equipment other than the set of candidate master user equipment in this group as well as the infrastructure. In the second type group, since the link between the master user equipment and the infrastructure takes charge of not only transmitting the data of the master user equipment but also forwarding the data of the slave user equipment, in order to simply calculation, the setting of the weight $\beta_j$ can be assumed as for example: if the network node $UE_j$ is the infrastructure, the weight $\beta_j$ is set as n, otherwise, the weight $\beta_j$ is set as 1.

It is to be understood that the manner of calculating the weighted closeness centrality given above is only an example but not limitation, and those skilled in the art may modify the above calculation manner according to the principle of the disclosure.

Further, as an example, there is also provided an index for measuring the distribution feature parameter of the user equipment, that is, a vertex having a maximum sum of weights of adjacent sides in an effective link metrology graph. Specifically, for the candidate master user equipment, for example, with an average value of a maximum value and a minimum value of the distance between the candidate master user equipment and member nodes associated with the candidate master user equipment in the group as a distance threshold $D_{th}$ and with this candidate master user equipment and these member nodes as vertexes, if the distance between network nodes corresponding to two vertexes is smaller than the distance threshold $D_{th}$, a side is connected between these two vertexes and its weight is set as $\gamma_j$, and thus an effective link metrology graph regarding this candidate master user equipment is obtained. With a sum of weights of the sides connected with the vertex corresponding to the candidate master user equipment as the measuring index, and the larger the sum of the weights of the sides is, it indicates that the candidate master user equipment is closer to the center of the communication data stream, and thus is more suitable to be the master user equipment in this group. It is to be noted that, for the first/second type group, a rule for selecting the member nodes associated with each candidate master user equipment and setting the side weight $\gamma_j$ is the same as that of setting the weight $\beta_j$ when calculating the weighted closeness centrality described above, and thus no repeated description will be made herein.

It is to be understood that the manner of establishing the effective link metrology graph given above is only an example but not limitation, and those skilled in the art may modify the above described specific details according to the principle of the disclosure, for example, the distance threshold $D_{th}$ may be the minimum distance among the nodes or a distance value preset by the user or the like.

Further, it is also to be understood that although two manner of calculating the distribution feature parameter of the user equipment have been given above, these are only examples but not limitation, and those skilled in the art may adopt any other manners to calculate the distribution parameter as long as these manners fall within the scope of the principle of the invention.

Figure 7:
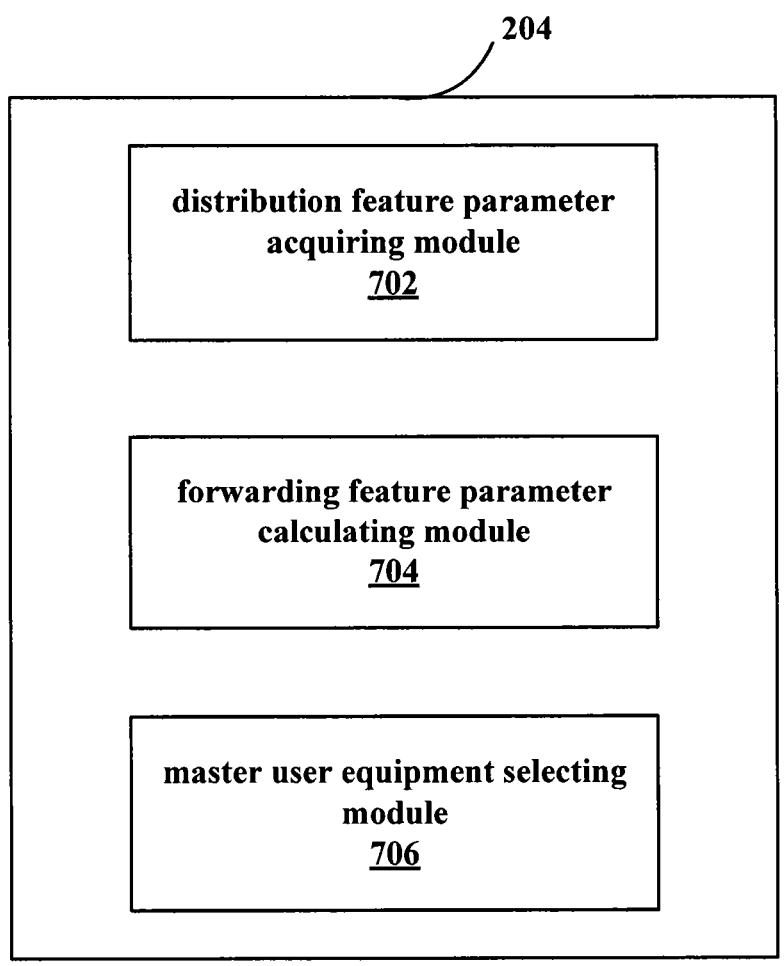
FIG. 7 is a block diagram illustrating another example of functional configuration of the master user equipment determining unit in the device as shown in FIG. 2.

Another example of functional configuration of the master user equipment determining unit 204 will be described with reference to FIG. 7 below. FIG. 7 is a block diagram illustrating another example of functional configuration of the master user equipment determining unit in the device as shown in FIG. 2.

As shown in FIG. 7, the master user equipment determining unit 204 may include a distribution feature parameter acquiring module 702, a forwarding feature parameter calculating module 704 and a master user equipment selecting module 706. Particularly, the functional configuration of the distribution feature parameter acquiring module 702 is the same as that of the distribution feature parameter acquiring module 402 described above with reference to FIGS. 4-6, and thus no details thereof will be repeated herein. Examples of the functional configurations of the forwarding feature parameter calculating module 704 and the master user equipment selecting module 706 will be described in detail below.

Preferably, the user equipment parameter acquired from the user equipment by the user equipment parameter acquiring unit 202 described above may further include an amount of data and signaling forwarding of the user equipment, a forwarding probability indicating that the user equipment succeeds in forwarding and a forwarding level indicating forwarding capability of the user equipment and the like.

Specifically, the amount of data and signaling forwarding $d_i$ of the user equipment $UE_i$ may for example be defined as an average forwarding amount of the user equipment for a predetermined time period.

The forwarding probability $p_i$ indicates a probability that the user equipment $UE_i$ succeeds in forwarding, which is a derivate parameter of the amount of data and signaling forwarding, and can be set in the following way for example: for any user equipment, if the amount of the data and signaling forwarding is larger than a predetermined threshold of forwarding amount $d_{th}$, the user equipment is rewarded, that is, the forwarding probability of the user equipment is increased; otherwise, the user equipment is punished, that is, the forwarding probability of the user equipment is decreased. That is to say, the user equipment which bears more forwarding task may also have priority to obtain the forwarding service in the communication service, which advantageously encourages willingness of the user equipment to actively bear the data forwarding task at idle time, facilitating reasonable resource configuration.

Assuming the initial values of both the forwarding amount $d_i$ and the forwarding probability $p_i$ of each user equipment $UE_i$ are 0, and as the network state changes, a new forwarding amount $d_i'$ of each user equipment is counted every a predetermined time T, while the forwarding probability $p_i'$ is updated, and the specific updating method can be for example as follows: with the divided group as a unit, assuming a changing speed (that is, a speed of adjusting the forwarding probability) is $\delta$, the total number of the user equipment is $n_{UE}$, the number of the user equipment the forwarding amount of which exceeds the predetermined threshold and which is rewarded is $n_{re}$, the number of the punished user equipment is $n_{UE}$-$u_{re}$, and thus for the rewarded user equipment, the updated forwarding probability is $$p_i' = \min\left\{p_i + \frac{\delta}{n_{re}}, 1\right\},$$

and for the punished user equipment, the updated forwarding probability is $$p_i' = \max\left\{p_i - \frac{\delta}{n_{UE} - n_{re}}, 0\right\}.$$

The forwarding level $l_i$ of the user equipment $UE_i$ indicates the forwarding capability of the user equipment, which can be for example determined by factors of data processing capability, electric amount and the like of the user equipment in combination, and can be quantified as a plurality of levels. As an example, one definition method of the forwarding level can be the lower the level is, the stronger the forwarding capability is.

It is to be understood that the calculation methods of the forwarding amount, the forwarding probability and the forwarding level of the user equipment given above are only examples but not limitation, and those skilled in the art may calculate in other manners according to the principle of the disclosure.

Therefore, the forwarding feature parameter calculating module 704 may be configured to calculate the forwarding feature parameter of the user equipment according to at least one of the amount of data and signaling forwarding of the user equipment, the forwarding probability indicating that the user equipment succeeds in forwarding and the forwarding level indicating forwarding capability of the user equipment. Preferably, the forwarding feature parameter calculating module 704 may be further configured to calculate the forwarding feature parameter of the user equipment in each group according to the above grouped user equipment.

It can be understood that the introduction of the forwarding feature parameter ensures the fairness when the user equipment provides and obtains the forwarding service and takes the difference in roles of the user equipment into consideration, which advantageously encourages the willingness of the user equipment to bear the data forwarding, and thus facilitating improvement in network capacity.

The master user equipment selecting module 706 may preferably be configured to select the master user equipment according to the distribution feature parameter acquired by the distribution feature parameter acquiring module 702 and the forwarding feature parameter calculated by the forwarding feature parameter calculating module 704.

The master user equipment selecting module 706 may select the master user equipment according to different optimization objects of the network performance. Specifically, if maximization of the network capacity is the optimization object, then the master user equipment selecting module 706 may select the master user equipment according to the distribution feature parameter, for example, selecting the master user equipment in an ascending order of the weighted closeness centrality or in a descending order of the sum of the weights of the adjacent sides of the effective link metrology graph; if maximization of user fairness is the optimization object, the master user equipment may be selected according to the forwarding feature parameter, for example, the master user equipment is selected in an ascending order of the forwarding probability or the forwarding level; and if both the network capacity and the user fairness are considered, the distribution feature parameter and the forwarding feature parameter are considered in combination, for example, the master user equipment may be selected in an ascending order of a product of the weighted closeness centrality and the forwarding probability.

The number of the selected master user equipment may be determined according to the optimization objects of the network performance and the networking mode requirements. In the embodiments of the disclosure, only one master user equipment is selected for each group of user equipment, which takes charge of the communication between other user equipment in this group and between other user equipment and the infrastructure.

As can be seen from above, both the network capacity and the user fairness may be considered when the master user equipment selecting module 706 selects the master user equipment, and thus it is possible to improve practicability of the concept that the user equipment serves as supplementation for the infrastructure and improve rate of resource utilization.

Returning back to FIG. 2, the communicating unit 206 may be configured to send a networking control signaling including information about the determined master user equipment to the user equipment. The networking control signaling may be used to determine construction of wireless links of the network, that is, determine a route for communication between respective user equipment and between the user equipment and the infrastructure.

Figure 8:
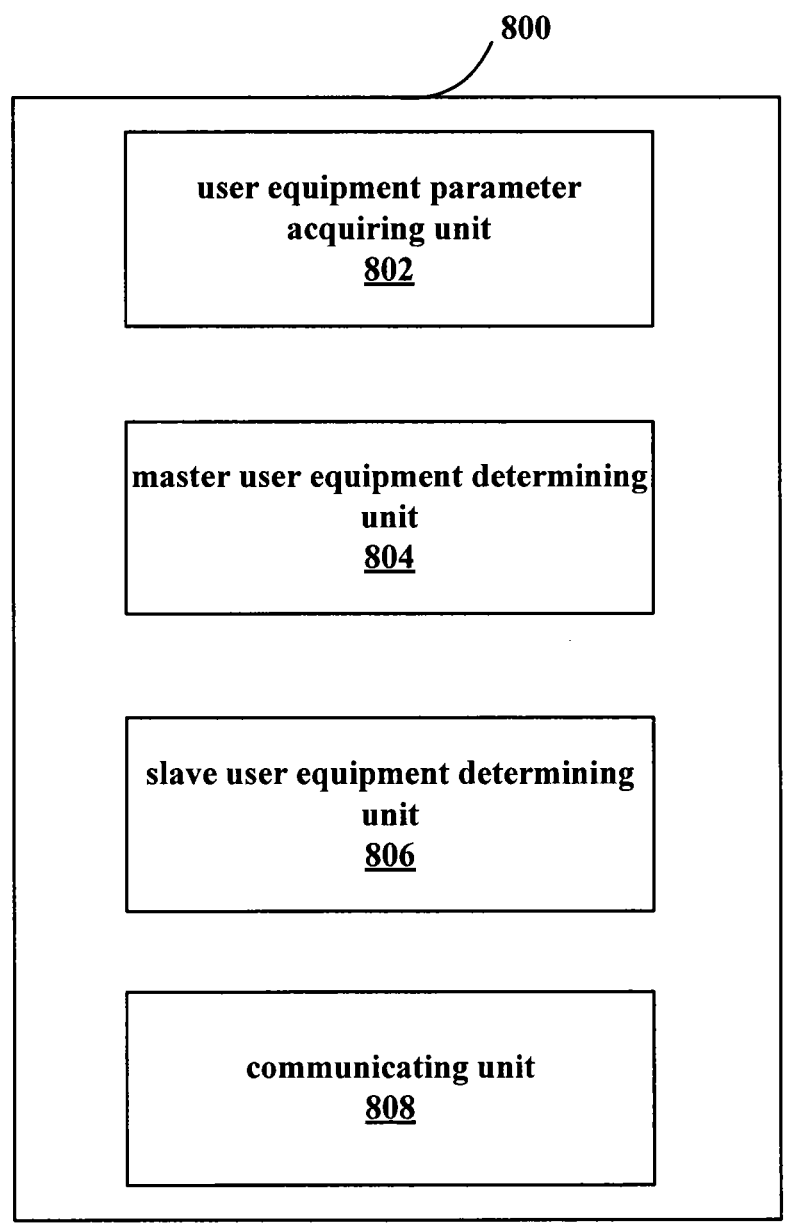
FIG. 8 is a block diagram illustrating an example of functional configuration of a device in a wireless communication system according to another embodiment of the disclosure.

An example of functional configuration of a device in a wireless communication system according to another embodiment of the disclosure will be described with reference to FIG. 8 below. FIG. 8 is a block diagram illustrating an example of functional configuration of a device in a wireless communication system according to another embodiment of the disclosure.

As shown in FIG. 8, the device 800 may include a user equipment parameter acquiring unit 802, a master user equipment determining unit 804, a slave user equipment determining unit 806 and a communicating unit 808. Particularly, the functional configurations of the user equipment parameter acquiring unit 802 and the master user equipment determining unit 804 are the same as those of the user equipment parameter acquiring unit 202 and the master user equipment determining unit 204 described above with reference to FIGS. 2-7 respectively, and thus no details thereof will be described herein. Examples of the functional configurations of the slave user equipment determining unit 806 and the communicating unit 808 will be described in detail respectively below.

The slave user equipment determining unit 806 may be configured to select the slave user equipment associated with the determined master user equipment according to at least the above forwarding feature parameter, in which the slave user equipment communicates with other user equipment and the infrastructure via the associated master user equipment.

Specifically, for each of the grouped user equipment, after the master user equipment determining unit 804 has determined the master user equipment in the group, for the user equipment belonging to the first type group, all the user equipment in this group are selected as the slave user equipment.

For the user equipment belonging to the second type group, after the master user equipment determining unit 804 has determined the master user equipment in this group, the slave user equipment determining unit 806 may determine the slave user equipment in the following way: a link quality between each user equipment other than the master user equipment in this group and the master user equipment is measured, if the link quality is lower than the link quality between this user equipment and the infrastructure, these user equipment are determined to be connected to the network directly via the infrastructure; otherwise, for the remaining user equipment, if the optimization object is the network performance, the slave user equipment are selected in a descending order of the link quality to the master user equipment; if the optimization object is the user fairness, the associated slave user equipment are selected in a descending order of the forwarding probability; if both the network performance and the user fairness are considered, the channel quality and the forwarding feature parameter are considered in combination, for example, the slave user equipment may be selected in a descending order of the product of the channel quality and the forwarding probability; and if the optimization object is to maximize the network capacity, the slave user equipment may be selected in a descending order of an amount of advancement of the network capacity when each user equipment connects to the network via the master user equipment as compared with connecting to the network directly via the infrastructure. The number of the selected user equipment can be calculated in real time according to the bearing capability of the master user equipment, or can be determined by a threshold preset by the system.

It is to be understood that most suitable infrastructures for the user equipment other than the master user equipment and the slave user equipment in the first type group and the second type group and the user equipment in the third type group may be selected according to the link quality between the user equipment and each infrastructure and available radio resources using the method in the prior art, and thus these user equipment connect to the network directly via the selected infrastructures.

Although the examples of the manners of selecting the slave user equipment have been given above, it is to be understood that these are only examples but not limitation, and those skilled in the art may select the slave user equipment according to specific optimization objects of the network performance.

Then, the communicating unit 806 may be configured to send the networking control signaling including the information about the master user equipment and the slave user equipment to the user equipment, and thus the user equipment may complete the networking operation according to the received networking control signaling.

It is to be understood that the networking control signaling herein may include role allocation (the network user equipment, the master user equipment or the slave user equipment) of the user equipment to be networked and selection of the communication route between the user equipment and between the user equipment and the infrastructure, and thus the user equipment may select the best communication route (including one or more wireless links) for data communication according to the received networking control signaling, so as to increase the network capacity, improve communication quality and improve the resource utilization rate.

Although the specific implementation procedure of the dynamic network planning according to the embodiment of the disclosure has been described above, it is to be understood that this is only an example but not limitation, and those skilled in the art may modify the above scheme according to the principle of the disclosure. For example, preferably, for those user equipment always joining the same user equipment interconnection, for example, a plurality of personal computers in a work group established due to frequent data exchange in an office, or a plurality of terminal apparatuses sharing data resources at home (such as a smart phone, a personal digital assistant (PDA), a tablet computer, a personal computer or the like), the networking mode can also be determined according to history information (that is, role allocation and communication route selection of these user equipment), thereby facilitating the acceleration of the network allocation.

It is to be noted herein although the examples of the functional configurations of the device in the wireless communication system according to the embodiment of the disclosure have been described above with reference to FIGS. 1-8, it should understand that this is only an example but not limitation, and those skilled in the art may modify the above structure as required, for example, add or omit certain functional units or combine the functional units, and all these variants should be considered as falling within the substantive scope of the present technology.

Figure 9:
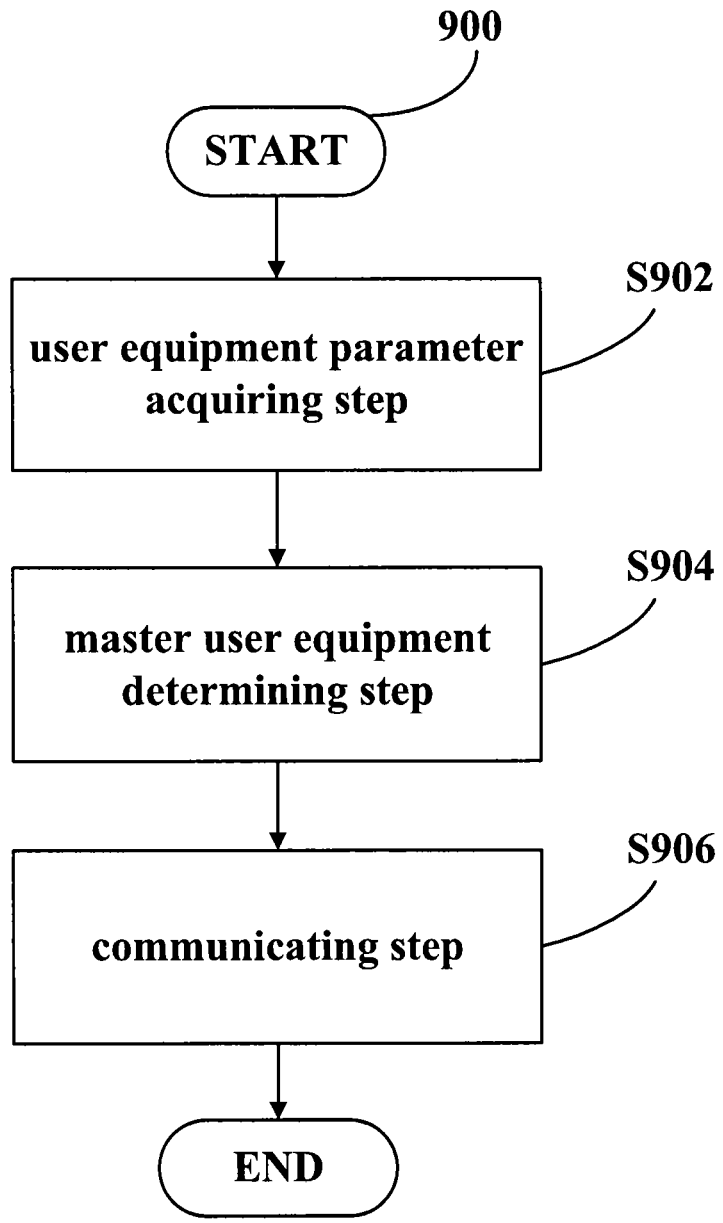
FIG. 9 is a flow chart illustrating a processing of a method for use in a wireless communication system according to an embodiment of the disclosure.

Corresponding to the device in the wireless communication system according to the embodiment of the disclosure, there is also provided a method for use in the wireless communication system. A processing example of a method for use in a wireless communication system according to an embodiment of the disclosure will be described with reference to FIG. 9 below. FIG. 9 is a flow chart illustrating a processing example of a method for use in a wireless communication system according to an embodiment of the disclosure.

As shown in FIG. 9, the method 900 for use in the wireless communication system according to the embodiment of the disclosure may include a user equipment parameter acquiring step S902, a master user equipment determining step S904 and a communicating step S906.

First, in the user equipment parameter acquiring step S902, the user equipment parameter may be acquired from the user equipment. Preferably, the user equipment parameter includes but not limited to the position information and the networking request signaling of the user equipment. The specific user equipment parameter acquiring procedure may be referred to description at corresponding position in the above device embodiment, and no description thereof will be repeated herein. Subsequently, the processing proceeds to the step S904.

In the master user equipment determining step S904, the master user equipment may be determined according to closeness of the user equipment to a center of communication data stream which is determined based on the user equipment parameter, in which the master user equipment is connected to an associated infrastructure and forwards data and/or signaling for other user equipment.

Figure 10:
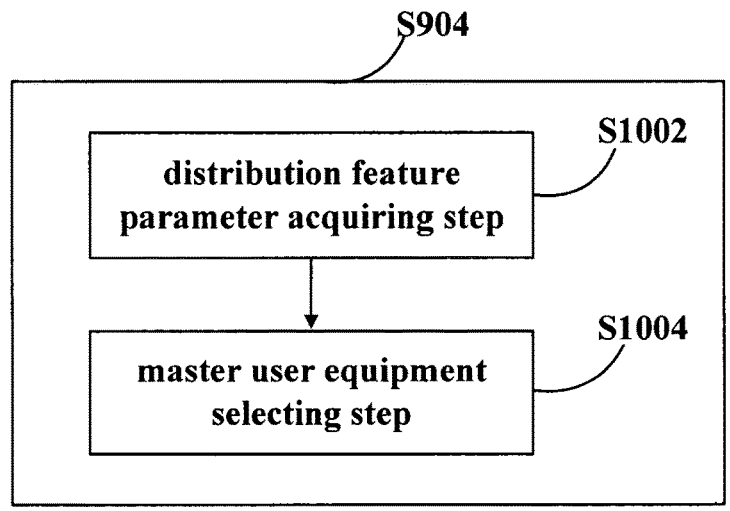
FIG. 10 is a flow chart illustrating an example of detailed processing in a master user equipment determining step in the method as shown in FIG. 9.

An example of detailed processing in the master user equipment determining step S904 will be described with reference to FIG. 10 below. FIG. 10 is a flow chart illustrating an example of detailed processing in the master user equipment determining step in the method as shown in FIG. 9.

As shown in FIG. 10, the master user equipment determining step S904 may further include a distribution feature parameter acquiring step S1002 and a master user equipment selecting step S1004.

First, in the distribution feature parameter acquiring step S1002, the distribution feature parameter indicating the closeness of the user equipment to the center of communication data stream may be acquired according to the user equipment parameter.

Figure 11:
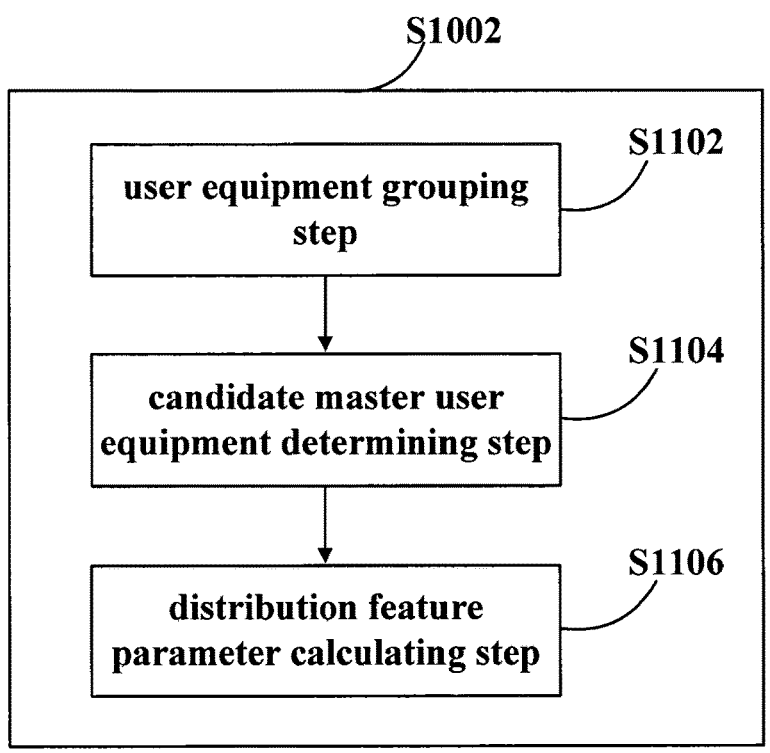
FIG. 11 is a flow chart illustrating an example of detailed processing in a distribution feature parameter acquiring step as shown in FIG. 10.

An example of detailed processing in the distribution feature parameter acquiring step S1002 will be described with reference to FIG. 11 below. FIG. 11 is a flow chart illustrating an example of detailed processing in the distribution feature parameter acquiring step as shown in FIG. 10.

As shown in FIG. 11, the distribution feature parameter acquiring step S1002 may further include a user equipment grouping step S1102, a candidate master user equipment determining step S1104 and a distribution feature parameter calculating step S1106.

First, in the user equipment grouping step S1102, the user equipment may be grouped according to a networking mode parameter in the user equipment parameter. Preferably, in the user equipment grouping step S1102, the user equipment for which the networking mode parameter indicates "user equipment interconnection" and which have the same interconnection ID are divided as a first type group, the user equipment for which the networking mode parameter indicates "being accessible via other user equipment" are divided as a second type group, and the user equipment for which the networking mode parameter indicates "accessing only via an infrastructure" are divided as a third type group. Then, the processing proceeds to the step S1104.

In the candidate master user equipment determining step S1104, a set of candidate master user equipment in each group of user equipment may be determined according to a link quality between each user equipment in this group and its associated infrastructure. Then, the processing proceeds to the step S1106.

In the distribution feature parameter calculating step S1106, the distribution feature parameter of each of the set of candidate master user equipment in each group may be calculated according to position information between each candidate master user equipment in this group and other user equipment as well as an infrastructure associated therewith.

Preferably, in the distribution feature parameter calculating step S1106, for the first type group, the distribution feature parameter of each candidate master user equipment may be calculated according to distances between this candidate master user equipment and all other user equipment in this group as well as an infrastructure associated with this candidate master user equipment, and for the second type group, the distribution feature parameter of each candidate master user equipment may be calculated according to distances between this candidate master user equipment and user equipment other than the set of candidate master user equipment in this group as well as an infrastructure associated with this candidate master user equipment.

Specific procedure of calculating the distribution feature parameter may be referred to the corresponding description in the device embodiment, and thus no description will be repeated herein.

Next, returning back to FIG. 10, after obtaining the distribution feature parameter of the user equipment, the processing proceeds to the step S1004.

In the master user equipment selecting step S1004, the master user equipment may be selected according to the distribution feature parameter.

Figure 12:
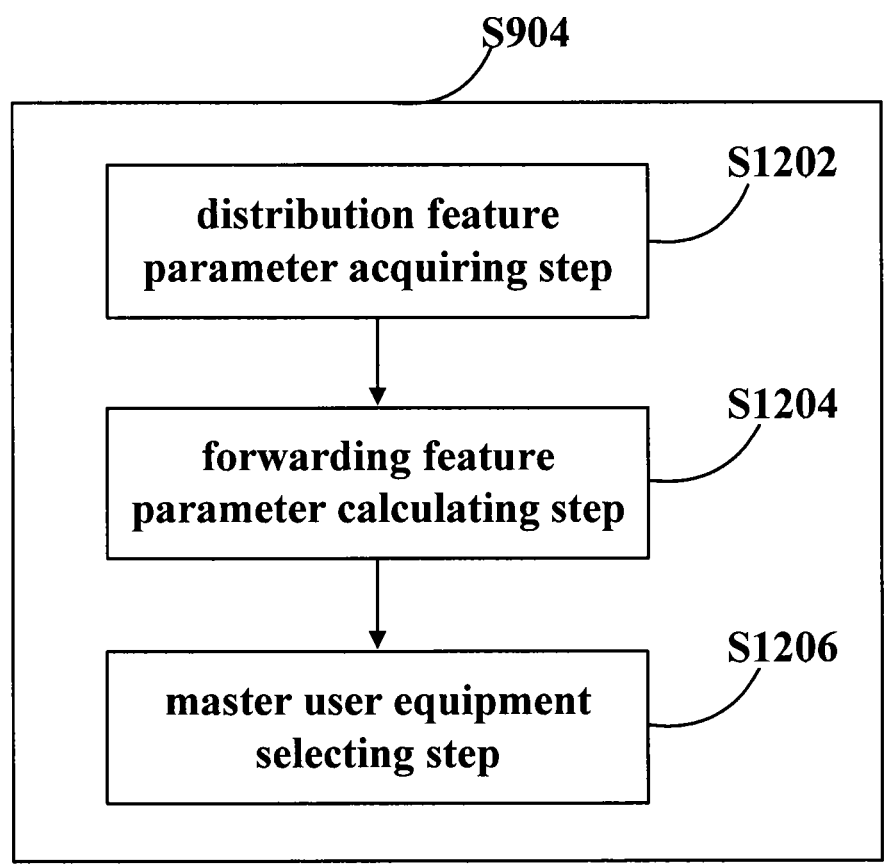
FIG. 12 is a flow chart illustrating another example of detailed processing in the master user equipment determining step in the method as shown in FIG. 9.

Preferably, another example of detailed processing in the master user equipment determining step S904 will be described with reference to FIG. 12. FIG. 12 is a flow chart illustrating another example of detailed processing in the master user equipment determining step in the method as shown in FIG. 9.

As shown in FIG. 12, the master user equipment determining step S904 may further include a distribution feature parameter acquiring step S1202, a forwarding feature parameter calculating step S1204 and a master user equipment selecting step S1206. Particularly, the processing in the distribution feature parameter acquiring step S1202 is the same as the processing in the distribution feature parameter acquiring step S1002 described above with reference to FIGS. 10 and 11, and thus no details thereof will be repeated herein. Examples of processing in the forwarding feature parameter calculating step S1204 and the master user equipment selecting step S1206 will be described in detail respectively below.

In the forwarding feature parameter calculating step S1204, the forwarding feature parameter of the user equipment may be calculated according to at least one of an amount of data and signaling forwarding of the user equipment, a forwarding probability indicating that the user equipment succeeds in forwarding and a forwarding level indicating forwarding capability of the user equipment which are included in the user equipment parameter. Next, the processing proceeds to the step S1206.

In the master user equipment selecting step S1206, the master user equipment may be selected according to the distribution feature parameter and the forwarding feature parameter. In this way, both the network capacity and the user fairness are considered, thereby facilitating improvement of the resource utilization rate.

Next, returning back to FIG. 9, after determining the master user equipment, the processing proceeds to the step S906.

In the communicating step S906, the networking control signaling including the information about the determined master user equipment may be sent to the user equipment. Thus, the user equipment may complete the networking operation according to the received networking control signaling.

Figure 13:
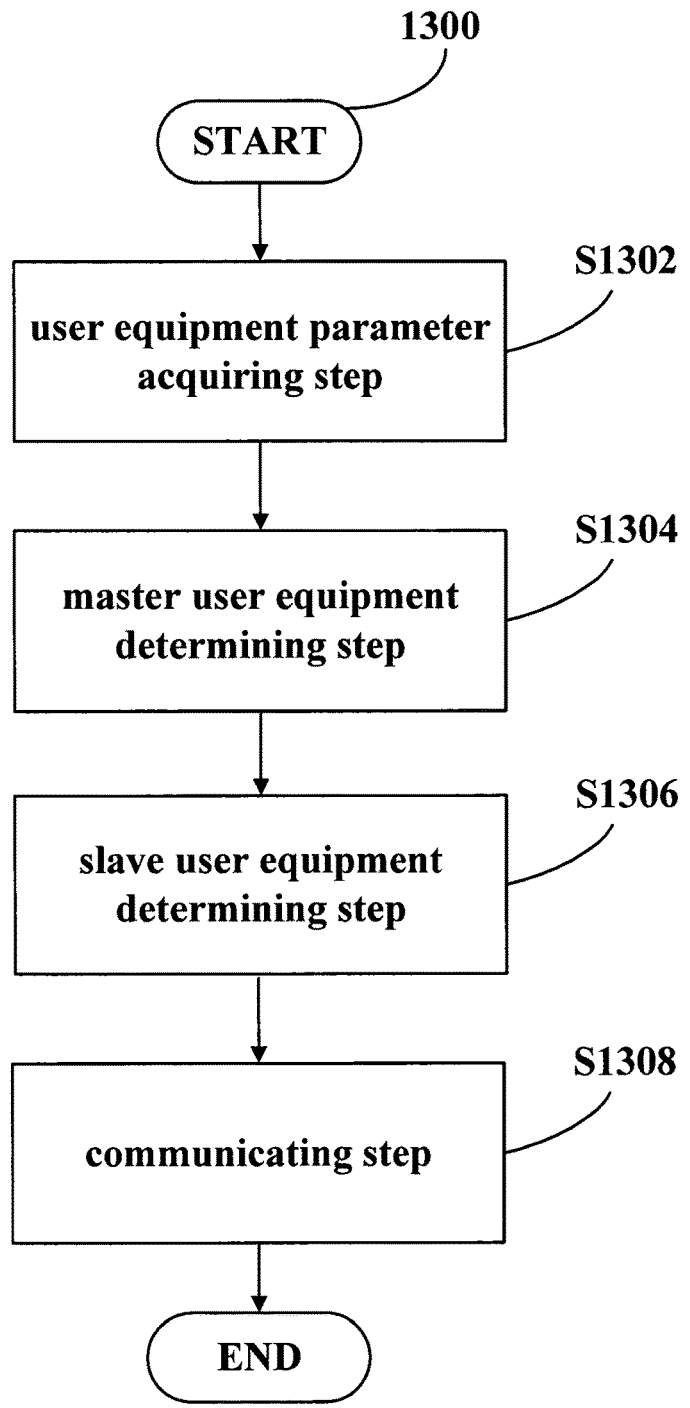
FIG. 13 is a flow chart illustrating a processing example of a method for use in a wireless communication system according to another embodiment of the disclosure.

An example of processing of a method for use in a wireless communication system according to another embodiment of the disclosure will be described with reference to FIG. 13 below. FIG. 13 is a flow chart illustrating an example of processing of a method for use in a wireless communication system according to another embodiment of the disclosure.

As shown in FIG. 13, the method 1300 for use in the wireless communication system according to the embodiment of the disclosure may include a user equipment parameter acquiring step S1302, a master user equipment determining step S1304, a slave user equipment determining step S1306 and a communicating step S1308. Particularly, the processing in the user equipment parameter acquiring step S1302 and the master user equipment determining step S1304 is the same as the processing in the user equipment parameter acquiring step S902 and the master user equipment determining step S904 described above with reference to FIGS. 9-12, and thus no details thereof will be repeated herein. The processing in the slave user equipment determining step S1306 and the communicating step S1308 will be described in detail respectively below.

In the slave user equipment determining step S1306, the slave user equipment associated with the determined master user equipment may be selected according to at least the forwarding feature parameter, in which the slave user equipment communicates with other user equipment and the infrastructure via the associated master user equipment. Specific procedure of determining the slave user equipment may be referred to corresponding description in the above device embodiment and will not be repeated herein.

Next, the processing proceeds to the step S1308.

In the communicating step S1308, the networking control signaling including the information about the determined master user equipment and slave user equipment may be sent to the user equipment.

Although the examples of the flow of the method for use in the wireless communication system according to the embodiment of the disclosure have been described above with reference to FIGS. 9-13, those skilled in the art should understand that the flow charts as shown in the drawings are merely exemplary, and may make corresponding modifications to the above method flows according to different actual applications and specific requirements.

It is to be noted that the method for use in the wireless communication system according to the embodiment of the disclosure corresponds to the foregoing device embodiment, and thus portions which are not described in detail in the method embodiment can be referred to the description at corresponding position in the device embodiment, no description will be repeated herein.

Figure 14:
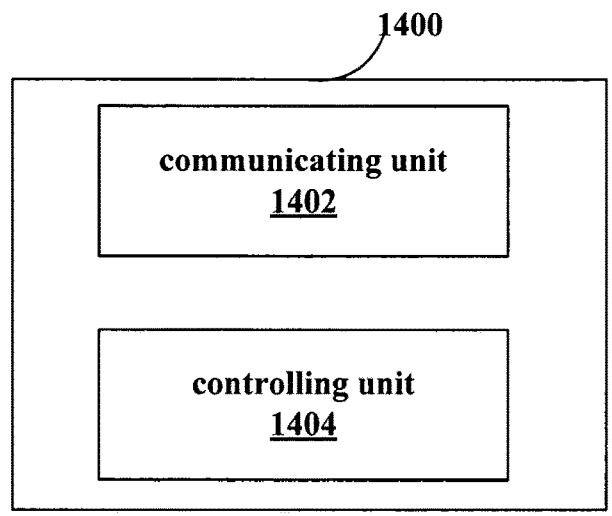
FIG. 14 is a block diagram illustrating an example of functional configuration of user equipment in a wireless communication system according to an embodiment of the disclosure.

An example of functional configuration of user equipment in a wireless communication system according to an embodiment of the disclosure will be described with reference to FIG. 14 below. FIG. 14 is a block diagram illustrating an example of functional configuration of user equipment in a wireless communication system according to an embodiment of the disclosure.

As shown in FIG. 14, the user equipment 1400 in the wireless communication system according to the embodiment of the disclosure may include a communicating unit 1402 and a controlling unit 1404.

The communicating unit 1402 may be configured to send the user equipment parameter to the above device 200 or 800 in the wireless communication system, and receive the corresponding networking control signaling from the device 200 or 800.

Specifically, when it needs to perform networking operation, the user equipment 1400 may first send the user equipment parameter including the above networking control signaling to the device 200 or 800 via the communicating unit 1402, and receive the corresponding networking control signaling from the device 200 or 800 after the device 200 or 800 has determined the networking decision according to the received user equipment parameter.

The controlling unit 1404 may be configured to control, if the networking control signaling received from the device 200 or 800 indicates that the user equipment 1400 is the master user equipment, the communicating unit 1402 to forward data and/or signaling between the slave user equipment associated with the master user equipment and between the slave user equipment and the infrastructure.

Preferably, if the networking control signaling received from the device 200 or 800 indicates that the user equipment 1400 is the slave user equipment, the controlling unit 1404 may control the communicating unit 1402 to communicate with other user equipment and/or an associated infrastructure via the master user equipment associated with the slave user equipment.

Figure 15:
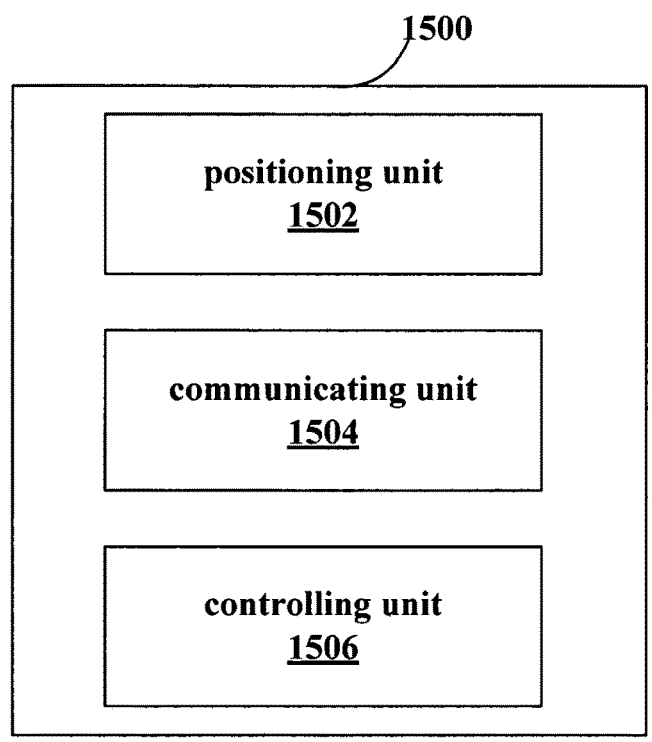
FIG. 15 is a block diagram illustrating an example of functional configuration of user equipment in a wireless communication system according to another embodiment of the disclosure.

An example of functional configuration of user equipment in a wireless communication system according to another embodiment of the disclosure will be described with reference to FIG. 15 below. FIG. 15 is a block diagram illustrating an example of functional configuration of user equipment in a wireless communication system according to another embodiment of the disclosure.

As shown in FIG. 15, the user equipment 1500 in the wireless communication system according to the embodiment of the disclosure may include a positioning unit 1502, a communicating unit 1504 and a controlling unit 1506. Particularly, the functional configuration of the controlling unit 1506 is the same as that of the controlling unit 1404 described above with reference to FIG. 14, and thus no details thereof will be described herein. Examples of the functional configurations of the positioning unit 1502 and the communicating unit 1504 will be described in detail respectively below.

The positioning unit 1502 may be configured to acquire the position information of the user equipment. Preferably, the positioning unit 1502 may acquire the position information of the user equipment through GPS measurement or network measurement (such as triangular measurement).

In addition to the function of the communicating unit 1402 described above with reference to FIG. 14, the communicating unit 1504 may be further configured to send the position information of the user equipment 1500 to the device 200 or 800 upon receipt of the position information request sent by the device 200 or 800.

It is to be noted that according to the embodiment of the disclosure, the networking control signaling may include role allocation (master user equipment, slave user equipment or network user equipment) and best communication route selection for the user equipment to be networked, and thus the user equipment may complete the networking operation according to the received networking control signaling to realize advancement of the network capacity, improvement of the communication performance and maximization of the user fairness, which enhances the practicability of the concept that the user equipment serves as supplementation for the infrastructure, enabling satisfying the requirement of the dynamic network planning with diverse user requirements and flexible networking mode.

Further, the embodiment of the disclosure further provides a storage medium including machine readable program codes, which when executed on an information processing apparatus, cause the information processing apparatus to perform the method for use in the wireless communication system according to the embodiments of the disclosure as described above.

Further, the embodiment of the disclosure further provides a program product including machine executable instructions, which when executed on an information processing apparatus, cause the information processing apparatus to perform the method for use in the wireless communication system according to the embodiments of the disclosure as described above.

Accordingly, a storage medium on which the above program product storing machine readable instruction codes is carried is also included in the disclosure of the invention. The storage medium includes but not limited to a floppy disk, an optical disk, a magneto-optical disk, a storage card, a memory rod and the like.

Furthermore, it shall be noted that the foregoing series of processes and apparatuses can also be embodied in software and/or firmware. In the case of being embodied in software and/or firmware, a program constituting the software is installed from a storage medium or a network to a computer with a dedicated hardware structure, e.g., a general purpose personal computer 1600 illustrated in FIG. 16, which can perform various functions when various programs are installed thereon.

Figure 16:
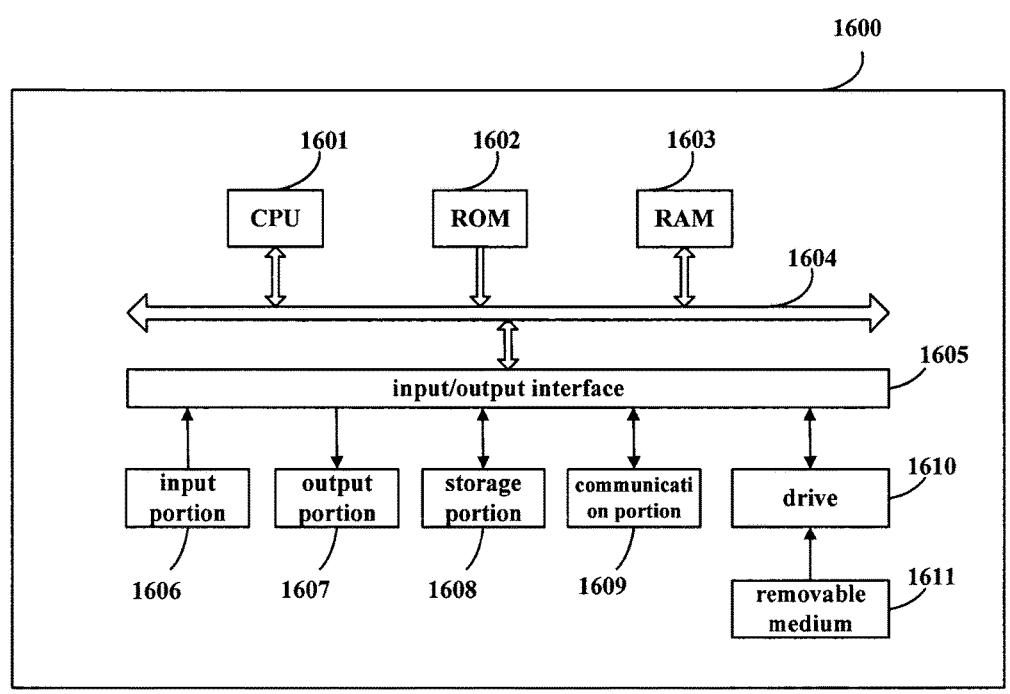
FIG. 16 is a block diagram illustrating an exemplary structure of a personal computer as an information processing apparatus that may be used in an embodiment of the disclosure.

In FIG. 16, a Central Processing Unit (CPU) 1601 performs various processes according to a program stored in a Read Only Memory (ROM) 1602 or loaded from a storage portion 1608 into a Random Access Memory (RAM) 1603 in which data required when the CPU 1601 performs the various processes is also stored as needed.

The CPU 1601, the ROM 1602 and the RAM 1603 are connected to each other via a bus 1604 to which an input/output interface 1605 is also connected.

The following components are connected to the input/output interface 1605: an input portion 1606 including a keyboard, a mouse, etc.; an output portion 1607 including a display, e.g., a Cathode Ray Tube (CRT), a Liquid Crystal Display (LCD), etc., a speaker, etc.; a storage portion 1608 including a hard disk, etc.; and a communication portion 1609 including a network interface card, e.g., an LAN card, a modem, etc. The communication portion 1609 performs a communication process over a network, e.g., the Internet.

A drive 1610 is also connected to the input/output interface 1605 as needed. A removable medium 1611, e.g., a magnetic disk, an optical disk, an magneto optical disk, a semiconductor memory, etc., can be installed on the drive 1610 as needed so that a computer program fetched therefrom can be installed into the storage portion 1608 as needed.

In the case that the foregoing series of processes are performed in software, a program constituting the software is installed from a network, e.g., the Internet, etc., or a storage medium, e.g., the removable medium 1611, etc.

Those skilled in the art shall appreciate that such a storage medium will not be limited to the removable medium 1611 illustrated in FIG. 16 in which the program is stored and which is distributed separately from the device to provide a user with the program. Examples of the removable medium 1611 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively, the storage medium can be the ROM 1602, a hard disk included in the storage portion 1608, etc., in which the program is stored and which is distributed together with the device including the same to the user.

It shall further be noted that the steps of the foregoing series of processes may naturally but not necessarily be performed in the sequential order as described chronically. Some of the steps may be performed concurrently or independently from each other.

Application Example

It is to be noted that in addition to the above mobile communication network, the technology according to the disclosure may be also applied to networking management of the following personal network. The amount of the personal electronic apparatuses in both the family entertainment environment and the office environment gradually increases, including a multi-media entertainment apparatus (such as a television, a game player, an audio/video player, a smart phone), an office apparatus (such as the tablet computer, a notebook computer, a desktop computer or the like), a storage and backup apparatus (such as a backup storage array or the like), a network access apparatus (such as a router or the like). The sharp increase of the amount of the personal apparatuses brings great trouble for data updating and synchronization. As the cloud computing technology becomes mature, an increasingly popular method is to store and process the data on the cloud side, and the personal electronic apparatus does not provide local storage but exchanges data with the cloud side via an access point on a high speed communication link. Since the layout at home or in the office is always very complex, and the position of the user equipment frequently changes, it is difficult to ensure the effectiveness and performance of the wireless network constituted among the apparatuses. If the dynamic network planning function is embedded in the access point on the cloud side and the networking mode parameter of each apparatus is set as "accessible via other user equipment" by using the method of the invention, it is possible to flexibly perform networking according to the status of each apparatus, thereby greatly ensuring the network performance.

The invention claimed is:

1. A device in a wireless communication system, the device comprising:
    circuitry configured to
    acquire a user equipment parameter from user equipment,
    determine master user equipment according to proximity of the user equipment to a center of communication data process flow which is determined based on the user equipment parameter, wherein the master user equipment is connected to an associated infrastructure and forwards data and/or signaling for other user equipment, the center of communication data process flow including communication load on the link among network nodes, channel quality, and geographic position of each user equipment, and
    send to the user equipment a networking control signaling including information about the master user equipment.

2. The device according to claim 1, wherein the circuitry is further configured to determine the master user equipment by being further configured to
    acquire a distribution feature parameter indicating the proximity of the user equipment to the center of the communication data processing flow according to the user equipment parameter, and
    select the master user equipment according to the distribution feature parameter.

3. The device according to claim 2, wherein the circuitry is further configured to determine the master user equipment by being further configured to
    calculate a forwarding feature parameter of the user equipment according to at least one of an amount of data and signaling forwarding of the user equipment, a forwarding probability indicating that the user equipment succeeds in forwarding and a forwarding level indicating forwarding capability of the user equipment which are included in the user equipment parameter, and
    select the master user equipment according to the forwarding feature parameter.

4. The device according to claim 3, wherein the circuitry is further configured to
    group the user equipment according to a networking mode parameter in the user equipment parameter,
    determine a set of candidate master user equipment in each group of user equipment according to a link quality between each user equipment in this group and associated infrastructure, and
    calculate the distribution feature parameter of each of the set of candidate master user equipment in each group according to position information between each candidate master user equipment in this group and other user equipment as well as an infrastructure associated therewith.

5. The device according to claim 4, wherein circuitry is further configured to divide the user equipment for which the networking mode parameter indicates establishment of device to device interconnection and/or point to multi-point interconnection and which have the same interconnection identifier as a first type group, divide the user equipment for which the networking mode parameter indicates being accessible via other user equipment as a second type group, and divide the user equipment for which the networking mode parameter indicates accessing only via an infrastructure as a third type group.

6. The device according to claim 5, wherein for the second type group, the circuitry is further configured to divide coverage of the infrastructure into a plurality of sectors according to regional distribution so that user equipment in each sector are divided as one group, and
    determine the set of candidate master user equipment in a unit of sector.

7. The device according to claim 5, wherein for the first type group, the circuitry is configured to calculate the distribution feature parameter of each candidate master user equipment in this group according to distances between said candidate master user equipment and all other user equipment in this group as well as an infrastructure associated with this candidate master user equipment, and
    wherein for the second type group, the circuitry is configured to calculate the distribution feature parameter of each candidate master user equipment in this group according to distances between this candidate master user equipment and user equipment other than the set of candidate master user equipment in this group as well as an infrastructure associated with this candidate master user equipment.

8. The device according to claim 4, wherein the circuitry is further configured to calculate the distribution feature parameter of each of the set of candidate master user equipment in each group according to transmission load on a communication link associated with this candidate master user equipment.

9. The device according to claim 4, wherein the circuitry is further configured to calculate the forwarding feature parameter of the user equipment in each group based on the grouped user equipment.

10. The device according to claim 3, wherein the circuitry is further configured to
    select slave user equipment associated with the master user equipment according to at least the forwarding feature parameter, wherein the slave user equipment communicates with other user equipment and the infrastructure via the associated master user equipment, and
    send the networking control signaling including information about the slave user equipment to the user equipment.

11. A method in a wireless communication system, the method comprising:
    acquiring a user equipment parameter from user equipment;
    determining master user equipment according to proximity of the user equipment to a center of communication data process flow which is determined based on the user equipment parameter, wherein the master user equipment is connected to an associated infrastructure and forwards data and/or signaling for other user equipment, the center of communication data process flow including communication load on the link among network nodes, channel quality, and geographic position of each user equipment; and sending to the user equipment a networking control signaling including information about the master user equipment.

12. The method according to claim 11, wherein the determining step further comprises:
acquiring a distribution feature parameter indicating the proximity of the user equipment to the center of communication data process flow according to the user equipment parameter; and
selecting the master user equipment according to the distribution feature parameter.

13. The method according to claim 12, wherein the determining step further comprises:
calculating a forwarding feature parameter of the user equipment according to at least one of an amount of data and signaling forwarding of the user equipment, a forwarding probability indicating that the user equipment succeeds in forwarding and a forwarding level indicating forwarding capability of the user equipment which are included in the user equipment parameter, and
wherein in the selecting step, the master user equipment is selected further according to the forwarding feature parameter.

14. The method according to claim 13, wherein the acquiring step further comprises:
grouping the user equipment according to a networking mode parameter in the user equipment parameter;
determining a set of candidate master user equipment in each group of user equipment according to a link quality between each user equipment in this group and its associated infrastructure; and
calculating the distribution feature parameter of each of the set of candidate master user equipment in each group according to position information between each candidate master user equipment in this group and other user equipment as well as an infrastructure associated therewith.

15. The method according to claim 14, wherein in the grouping step, the user equipment for which the networking mode parameter indicates establishment of device to device interconnection and/or point to multi-point interconnection and which have the same interconnection identifier are further divided as a first type group, the user equipment for which the networking mode parameter indicates being accessible via other user equipment are divided as a second type group, and the user equipment for which the networking mode parameter indicates accessing only via an infrastructure are divided as a third type group.

16. The method according to claim 15, wherein for the first type group, in the calculating the distribution feature parameter step, the distribution feature parameter of each candidate master user equipment in this group is calculated according to distances between this candidate master user equipment and all other user equipment in this group as well as an infrastructure associated with this candidate master user equipment, and
wherein for the second type group, in the calculating the distribution feature parameter step, the distribution feature parameter of each candidate master user equipment in this group is calculated according to distances between this candidate master user equipment and user equipment other than the set of candidate master user equipment in this group as well as an infrastructure associated with this candidate master user equipment.

17. The method according to claim 13, further comprising:
selecting slave user equipment associated with the master user equipment according to at least the forwarding feature parameter, wherein the slave user equipment communicates with other user equipment and the infrastructure via the associated master user equipment, and
wherein in the sending step, the networking control signaling including information about the slave user equipment is further sent to the user equipment.

* * * * *